United States Patent
Zhou et al.

(10) Patent No.: US 12,418,812 B2
(45) Date of Patent: Sep. 16, 2025

(54) ENHANCED SIGNALING FOR BEAM FAILURE DETECTION REFERENCE SIGNAL WITH UE PREDICTED BEAM FAILURE

(71) Applicant: QUALCOMM Incorporated, San Diego, CA (US)

(72) Inventors: Shanyu Zhou, San Diego, CA (US); Jelena Damnjanovic, Del Mar, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 763 days.

(21) Appl. No.: 17/687,219

(22) Filed: Mar. 4, 2022

(65) Prior Publication Data

US 2023/0284054 A1  Sep. 7, 2023

(51) Int. Cl.
*H04W 24/08* (2009.01)
*H04L 5/00* (2006.01)

(52) U.S. Cl.
CPC .......... *H04W 24/08* (2013.01); *H04L 5/0048* (2013.01)

(58) Field of Classification Search
CPC .... H04W 24/08; H04L 5/0048; H04L 5/0025; H04L 5/0053; H04L 5/0094
See application file for complete search history.

(56) References Cited

U.S. PATENT DOCUMENTS

| | | | | |
|---|---|---|---|---|
| 11,277,302 B2* | 3/2022 | Cirik | ............ | H04W 76/28 |
| 11,349,548 B2* | 5/2022 | Mohandoss | ............ | H04B 17/17 |
| 2019/0238658 A1* | 8/2019 | Shimizu | ............ | H04W 4/46 |
| 2019/0261193 A1* | 8/2019 | Torsner | ............ | H04W 24/10 |
| 2020/0413273 A1* | 12/2020 | Turtinen | ............ | H04W 76/28 |
| 2021/0092003 A1* | 3/2021 | Zhou | ............ | H04B 7/0695 |
| 2021/0184748 A1* | 6/2021 | Luo | ............ | H04W 52/143 |
| 2021/0218457 A1* | 7/2021 | Xu | ............ | H04B 7/088 |
| 2021/0243073 A1* | 8/2021 | Pezeshki | ............ | H04L 41/16 |
| 2021/0258063 A1* | 8/2021 | Ottersten | ............ | H04W 24/10 |
| 2022/0022065 A1* | 1/2022 | Wang | ............ | H04W 24/08 |
| 2022/0029286 A1* | 1/2022 | Cho | ............ | H01Q 21/06 |
| 2022/0109547 A1* | 4/2022 | Svedman | ............ | H04B 7/0626 |
| 2022/0140884 A1* | 5/2022 | Shi | ............ | H04W 76/19 |
| | | | | 370/329 |
| 2022/0247474 A1* | 8/2022 | Rune | ............ | H04W 24/10 |
| 2023/0006727 A1* | 1/2023 | Jang | ............ | H04L 5/0051 |
| 2023/0084028 A1* | 3/2023 | Karimidehkordi | ............ | |
| | | | | H04B 7/06964 |
| | | | | 370/216 |

(Continued)

*Primary Examiner* — Hoang-Chuong Q Vu
(74) *Attorney, Agent, or Firm* — Arent Fox, LLP

(57) ABSTRACT

This disclosure provides systems, methods and apparatus, including computer programs encoded on computer storage media, for enhanced signaling related to beam failure prediction. A user equipment (UE) predicts a beam failure condition prior to a number of beam failure instances within a time period reaching a configured threshold number of beam failures. The UE transmits an indicator of the predicted beam failure condition to a serving cell. The indicator may include a request for a change to a beam failure detection reference signal (BFD-RS) or to UE scheduling. The serving cell transmits a notification of a change to the BFD-RS or to UE scheduling in response to the indicator. The UE may continue to monitor for a beam failure condition based on the change or may adjust reception during a predicted duration of the beam failure based on the change.

29 Claims, 11 Drawing Sheets

(56) References Cited

U.S. PATENT DOCUMENTS

| | | | |
|---|---|---|---|
| 2023/0088966 A1* | 3/2023 | Kocagoez | H04W 24/08 370/241 |
| 2023/0107880 A1* | 4/2023 | Zhu | H04L 5/0094 370/329 |
| 2023/0171836 A1* | 6/2023 | Butt | H04W 76/19 370/216 |
| 2023/0337277 A1* | 10/2023 | Niu | H04W 74/0808 |
| 2024/0349092 A1* | 10/2024 | Echigo | H04W 74/0833 |
| 2025/0030475 A1* | 1/2025 | Li | H04W 72/21 |
| 2025/0150918 A1* | 5/2025 | Löhr | H04W 76/27 |

\* cited by examiner

ENHANCED SIGNALING FOR BEAM FAILURE DETECTION REFERENCE SIGNAL WITH UE PREDICTED BEAM FAILURE

TECHNICAL FIELD

The present disclosure relates to wireless communications including enhanced signaling for beam failure detection reference signal (BFD-RS) with user equipment (UE) predicted beam failure.

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (such as with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard.

SUMMARY

The systems, methods and devices of this disclosure each have several innovative aspects, no single one of which is solely responsible for the desirable attributes disclosed herein.

In some aspects, the techniques described herein relate to a method of wireless communication for a user equipment (UE), including: predicting a beam failure prior to a number of beam failure instances within a time period reaching a configured threshold number of beam failures; transmitting an indicator of the predicted beam failure to a serving cell; and receiving a notification of a change to a beam failure detection reference signal (BFD-RS) or to UE scheduling in response to the indicator.

The present disclosure also provides an apparatus (e.g., a UE) including a memory storing computer-executable instructions and at least one processor configured to execute the computer-executable instructions to perform the above method, an apparatus including means for performing the above method, and a non-transitory computer-readable medium storing computer-executable instructions for performing the above method.

One innovative aspect of the subject matter described in this disclosure can be implemented in a method of wireless communication at an apparatus of a transmitting device such as a base station (BS). In some aspects, the techniques described herein relate to a method of wireless communication at a serving cell, including: receiving an indicator of a predicted beam failure at a UE; and transmitting a notification of a change to a beam failure detection reference signal (BFD-RS) or to UE scheduling in response to the indicator.

The present disclosure also provides an apparatus (e.g., a BS) including a memory storing computer-executable instructions and at least one processor configured to execute the computer-executable instructions to perform the above method, an apparatus including means for performing the above method, and a non-transitory computer-readable medium storing computer-executable instructions for performing the above method.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
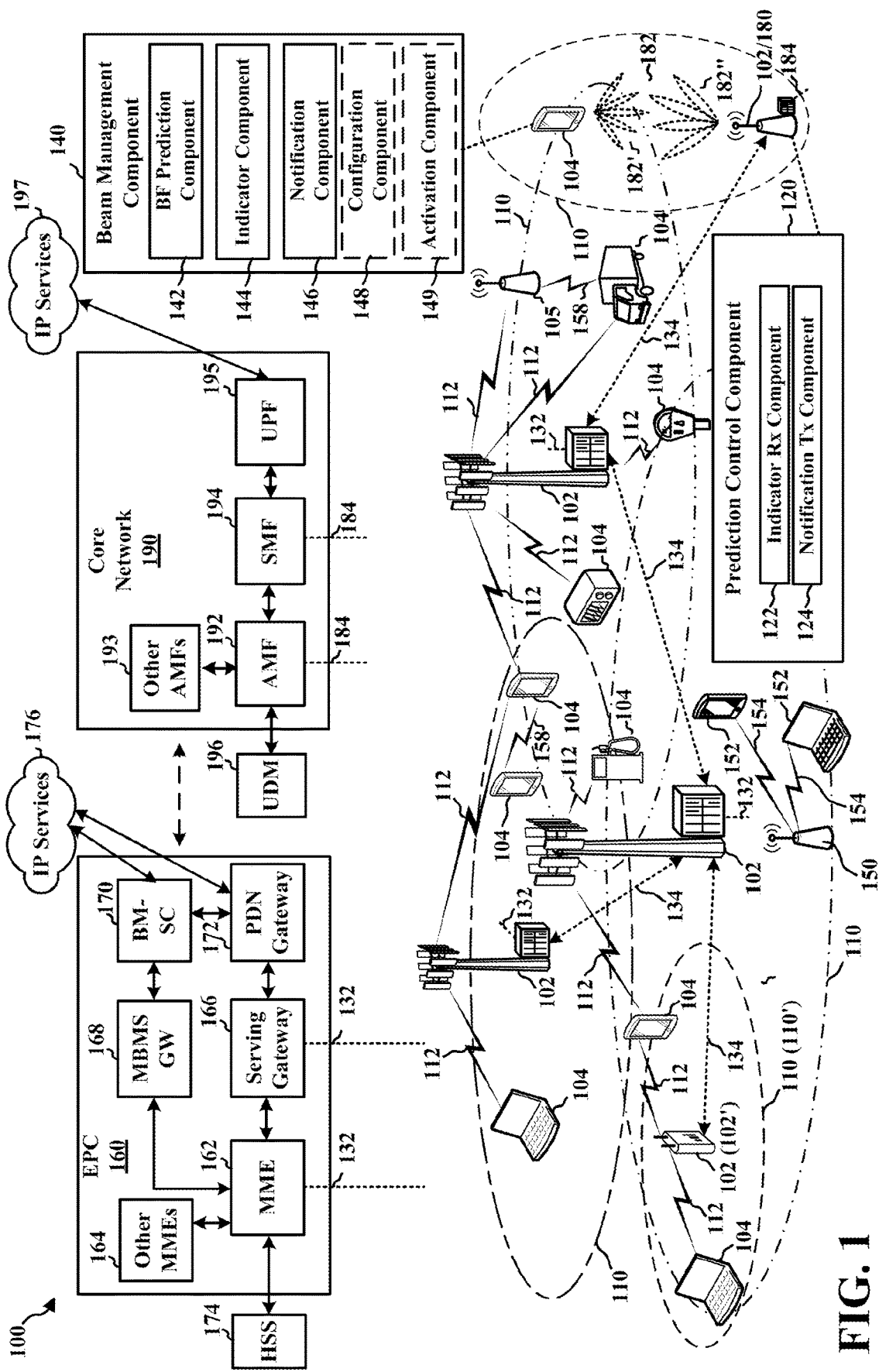
FIG. 1 is a diagram illustrating an example of a wireless communications system and an access network.

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards. However, the described implementations may be implemented in any device, system or network that is capable of transmitting and receiving RF signals according to any of the wireless communication standards, including any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

In wireless communications, beamforming may be used to compensate for power loss in communication between a transmitter and receiver. For example, in millimeter wave (mmW or mmWave) communications, the frequency may be relatively high compared to conventional communication channels and signal attenuation may be relatively large. However, due to the uncertain nature of a wireless environment and unexpected blocking, beam may be vulnerable to beam failure. 5G systems may implement a beam failure detection (BFD) procedure to assist in maintaining a strong channel connection between a user equipment (UE) and a base station. In a BFD procedure, the UE may be configured with rules for determining whether a beam failure has occurred based on physical layer measurements of a beam failure detection reference signal (BFD-RS). For example, the UE may count a number of beam failure instances during a measurement window. If the number of beam failure instances satisfies a threshold during the measurement window, the UE may declare a beam failure.

In some cases, a UE may be able to predict a beam failure before the UE has satisfied the configured rules for declaring a beam failure. For example, a UE may include additional sensors such as a camera or radar that can be used to predict a blockage scenario before the threshold number of beam failure instances occur. As another example, a UE may train a machine-learning model based on the beam failure detection and/or other measurements to predict how likely a beam failure is to occur.

In an aspect, the present disclosure provides for enhanced signaling related to beam failure detection. For example, when the UE predicts a likely beam failure, the UE may indicate the predicted beam failure to the base station. The base station may modify the BFD-RS or UE scheduling in response to the indicator. For example, the base station may change a BFD-RS pattern or periodicity. For instance, reducing the periodicity of the BFD-RS such that the UE is able to perform the physical layer measurements more frequently may allow the UE to declare a beam failure more quickly. In some implementations, for example, where the UE is able to detect a limited blockage, the indicator of the predicted beam failure may include a request not to schedule the UE or a request not to transmit the BFD-RS.

Particular implementations of the subject matter described in this disclosure can be implemented to realize one or more of the following potential advantages. The enhanced signaling for BFD-RS may allow a UE to detect a beam failure more quickly. Accordingly, the UE may be able to recover from the failed beam. Additionally, the base station may improve scheduling or power efficiency based on prediction of a beam failure.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. The processor may include an interface or be coupled to an interface that can obtain or output signals. The processor may obtain signals via the interface and output signals via the interface. In some implementations, the interface may be a printed circuit board (PCB) transmission line. In some other implementations, the interface may include a wireless transmitter, a wireless transceiver, or a combination thereof. For example, the interface may include a radio frequency (RF) transceiver which can be implemented to receive or transmit signals, or both. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example implementations, the functions described may be implemented in hardware, software, or any combination thereof. If implemented in software, the functions may be stored on or encoded as one or more instructions or code on a computer-readable medium. Computer-readable media includes computer storage media, which may be referred to as non-transitory computer-readable media. Non-transitory computer-readable media may exclude transitory signals. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, relay devices 105, an Evolved Packet Core (EPC) 160, and another core network 190 (such as a 5G Core (5GC)). The base stations 102 may include macrocells (high power cellular base station) or small cells (low power cellular base station). The macrocells include base stations. The small cells include femtocells, picocells, and microcells. The small cells include femtocells, picocells, and microcells. The base stations 102 can be configured in a Disaggregated RAN (D-RAN) or Open RAN (O-RAN) architecture, where functionality is split between multiple units such as a central unit (CU), one or more distributed units (DUs), or a radio unit (RU). Such architectures may be configured to utilize a protocol stack that is logically split between one or more units (such as one or more CUs and one or more DUs). In some aspects, the CUs may be implemented within an edge RAN node, and in some aspects, one or more DUs may be co-located with a CU, or may be geographically distributed throughout one or multiple RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

In some implementations, one or more of the receiving devices such as UEs 104 may include beam management component 140 adapts a beam failure detection procedure based on a predicted beam failure. The beam management component 140 may include a BF prediction component 142 configured to predict a beam failure prior to a number of beam failure instances within a time period reaching a configured threshold number of beam failures. The beam management component 140 may include an indicator component 144 configured to transmit an indicator of the predicted beam failure to a serving cell. The beam management component 140 may include a notification component 146 configured to receive a notification of a change to a BFD-RS or UE scheduling in response to the indicator. The beam management component 140 may optionally include a configuration component 148 configured to receive a configuration of a triggering condition to predict the beam failure or a configuration of the indicator. The beam management component 140 may optionally include an activation component 149 configured to receive an activation or a deactivation of beam failure prediction.

In some implementations, one or more of the base stations 102 may include a prediction control component 120 configured to control beam failure prediction for a UE. The prediction control component 120 may include an indicator Rx component 122 configured to receive an indicator of a predicted beam failure at a UE. The prediction control component 120 may include a notification Tx component 124 configured to transmit a notification of a change to a BFD-RS or UE scheduling in response to the indicator.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (such as S1 interface), which may be wired or wireless. The base stations 102 configured for 5G NR (collectively referred to as Next Generation RAN (NG-RAN)) may interface with core network 190 through second backhaul links 184, which may be wired or wireless. In addition to other functions, the base stations 102 may perform one or more of the following functions: transfer of user data, radio channel ciphering and deciphering, integrity protection, header compression, mobility control functions (such as handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (such as through the EPC 160 or core network 190) with each other over third backhaul links 134 (such as X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network also may include Home Evolved Node Bs (eNBs) (HeNBs), which may provide service to a restricted group known as a closed subscriber group (CSG). The communication links 112 between the base stations 102 and the UEs 104 may include UL (also referred to as reverse link) transmissions from a UE 104 to a base station 102 or DL (also referred to as forward link) transmissions from a base station 102 to a UE 104. The communication links 112 may use multiple-input and multiple-output (MIMO) antenna technology, including spatial multiplexing, beamforming, or transmit diversity. The communication links may be through one or more carriers. The base stations 102/UEs 104 may use spectrum up to Y MHz (such as 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (such as more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to or increase capacity of the access network.

A base station 102, whether a small cell 102' or a large cell (such as macro base station), may include an eNB, gNodeB (gNB), or other type of base station. Some base stations, such as gNB 180 may operate in one or more frequency bands within the electromagnetic spectrum.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, or other IP services.

The base station may include or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (such as a MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (such as a parking meter, gas pump, toaster, vehicles, heart monitor, etc.). The UE 104 also may be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR, the concepts described herein may be applicable to other similar areas, such as LTE, LTE-A, CDMA, GSM, and other wireless technologies including future 6G technologies.

Figure 2:
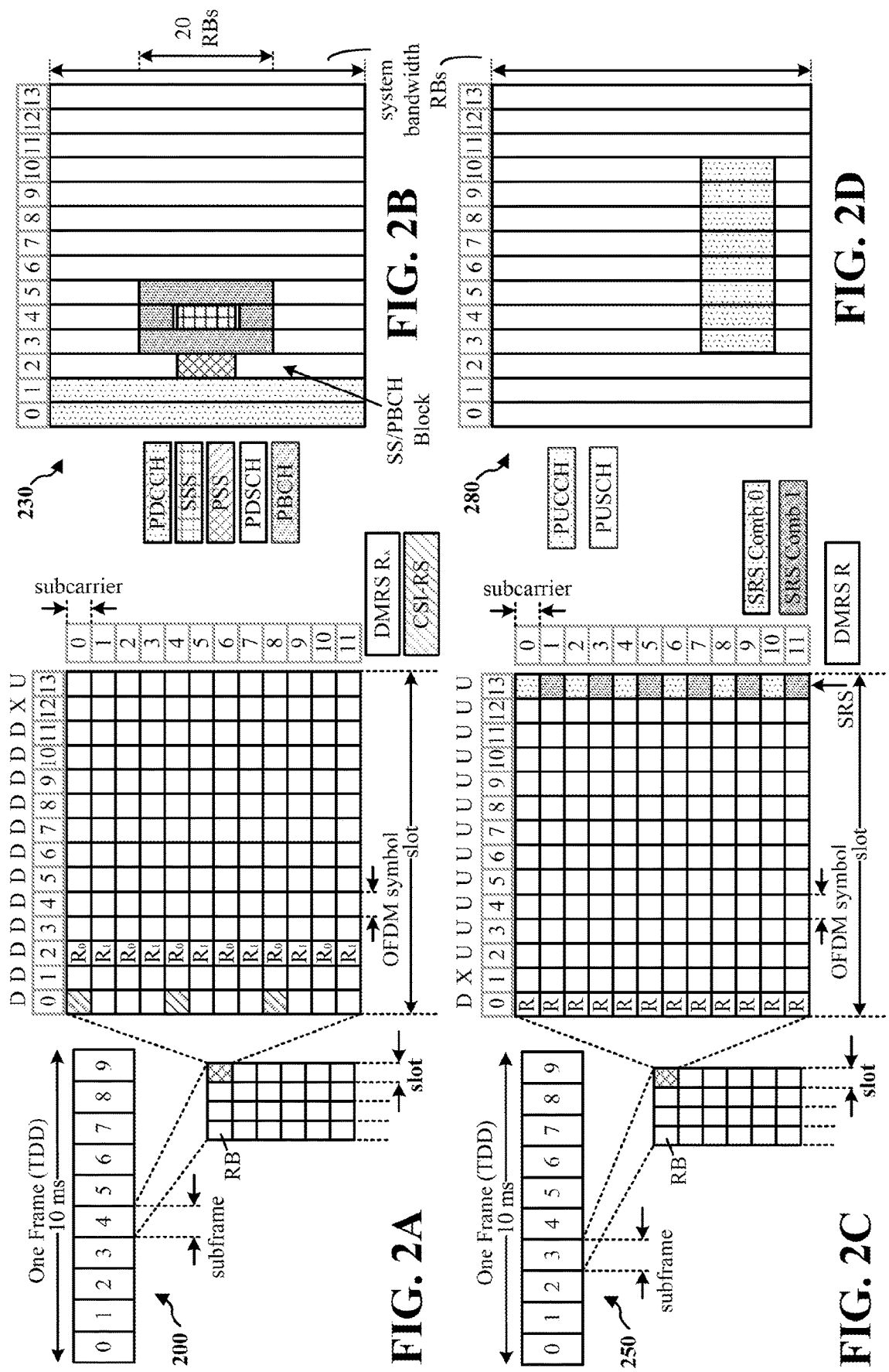
FIG. 2A is a diagram illustrating an example of a first frame.
FIG. 2B is a diagram illustrating an example of DL channels within a subframe.
FIG. 2C is a diagram illustrating an example of a second frame.
FIG. 2D is a diagram illustrating an example of a subframe.

FIG. 2A is a diagram 200 illustrating an example of a first frame. FIG. 2B is a diagram 230 illustrating an example of DL channels within a subframe. FIG. 2C is a diagram 250 illustrating an example of a second frame. FIG. 2D is a diagram 280 illustrating an example of a subframe. The 5G NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. A subset of the total cell bandwidth of a cell is referred to as a Bandwidth Part (BWP) and bandwidth adaptation is achieved by configuring the UE with BWP(s) and telling the UE which of the configured BWPs is currently the active one.

In the examples provided by FIGS. 2A, 2C, the 5G NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure or different channels. A frame (10 milliseconds (ms)) may be divided into 10 equally sized subframes (1 ms). Each subframe may include one or more time slots. Subframes also may include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 microseconds ($\mu$s).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS also may include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (SSB). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used.

The UE may transmit sounding reference signals (SRS). An SRS resource set configuration may define resources for SRS transmission. For example, as illustrated, an SRS configuration may specify that SRS may be transmitted in the last symbol of a subframe. The SRS may have a comb structure, and a UE may transmit SRS on one comb for each SRS port. The SRS may be used by a base station for channel quality estimation to enable frequency-dependent scheduling on the UL. The SRS may also be used for channel estimation to select a precoder for downlink MIMO.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), or UCI.

Figure 3:
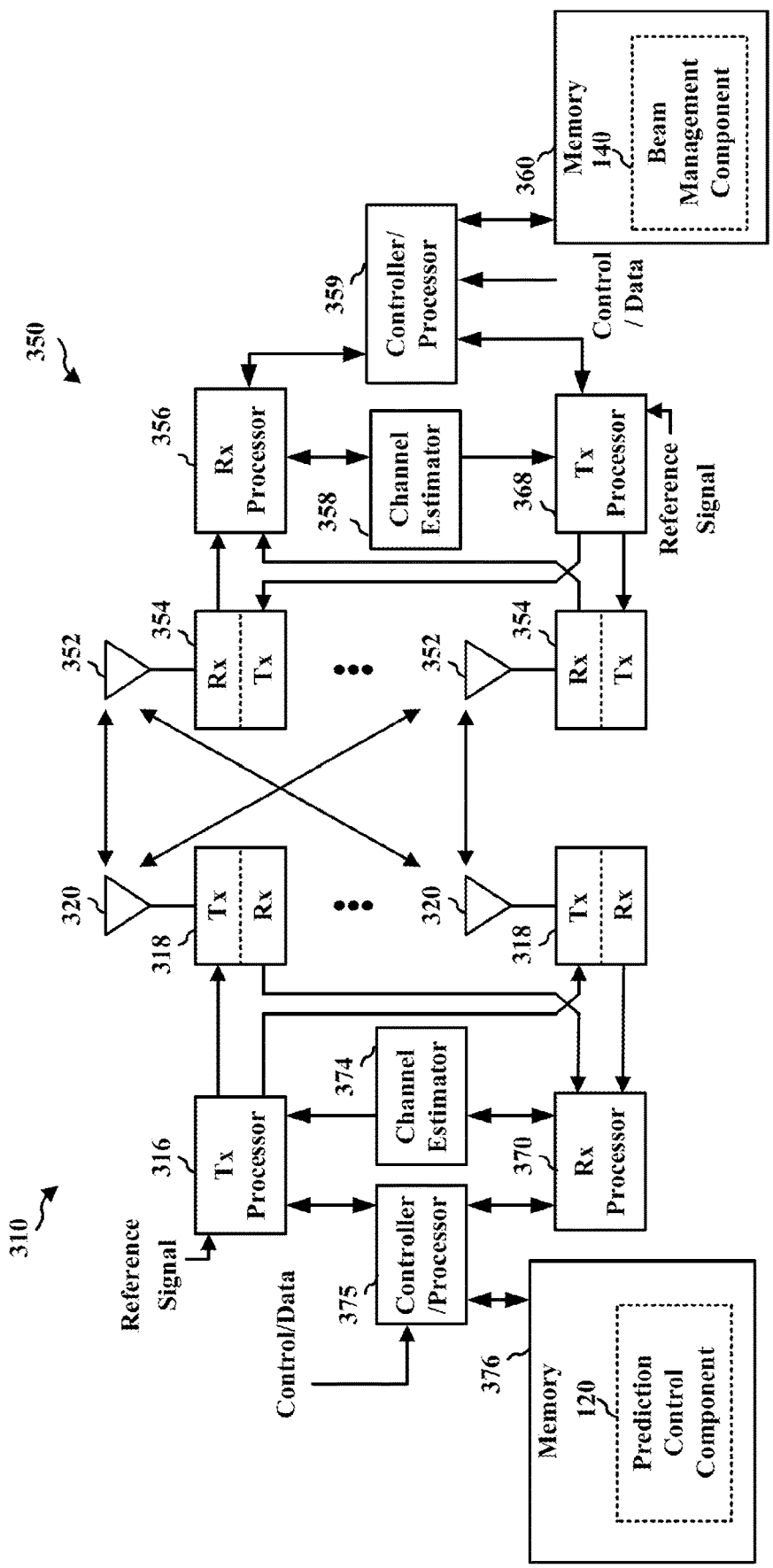
FIG. 3 is a diagram illustrating an example of a base station (BS) and user equipment (UE) in an access network.

FIG. 3 is a diagram of an example of a base station 310 and a UE 350 in an access network. The UE 350 may be an example of a receiving device. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (such as MIB, SIBs), RRC connection control (such as RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (Tx) processor 316 and the receive (Rx) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The Tx processor 316 handles mapping to signal constellations based on various modulation schemes (such as binary phase-shift keying (BPSK), quadrature phase-shift keying (QPSK), M-phase-shift keying (M-PSK), M-quadrature amplitude modulation (M-QAM)). The coded and modulated symbols may be split into parallel streams. Each stream may be mapped to an OFDM subcarrier, multiplexed with a reference signal (such as a pilot) in the time or frequency domain, and combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal or channel condition feedback transmitted by the UE 350. Each spatial stream may be provided to a different antenna 320 via a separate transmitter 318Tx. Each transmitter 318Tx may modulate an RF carrier with a respective spatial stream for transmission.

At the UE 350, each receiver 354Rx receives a signal through its respective antenna 352. Each receiver 354Rx recovers information modulated onto an RF carrier and provides the information to the receive (Rx) processor 356.

The Tx processor 368 and the Rx processor 356 implement layer 1 functionality associated with various signal processing functions. The Rx processor 356 may perform spatial processing on the information to recover any spatial streams destined for the UE 350. If multiple spatial streams are destined for the UE 350, they may be combined by the Rx processor 356 into a single OFDM symbol stream. The Rx processor 356 converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are decoded and deinterleaved to recover the data and control signals that were originally transmitted by the base station 310 on the physical channel. The data and control signals are provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK or NACK protocol to support HARQ operations.

Similar to the functionality described in connection with the DL transmission by the base station 310, the controller/processor 359 provides RRC layer functionality associated with system information (such as MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the Tx processor 368 to select the appropriate coding and modulation schemes, and to facilitate spatial processing. The spatial streams generated by the Tx processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a Rx processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK or NACK protocol to support HARQ operations.

At least one of the Tx processor 368, the Rx processor 356, and the controller/processor 359 may be configured to perform aspects in connection with the beam management component 140 of FIG. 1. For example, the memory 360 may include executable instructions defining the beam management component 140. The Tx processor 368, the Rx processor 356, and/or the controller/processor 359 may be configured to execute the beam management component 140.

At least one of the Tx processor 316, the Rx processor 370, and the controller/processor 375 may be configured to perform aspects in connection with the prediction control component 120 of FIG. 1. For example, the memory 376 may include executable instructions defining the prediction control component 120. The Tx processor 316, the Rx processor 370, and/or the controller/processor 375 may be configured to execute the prediction control component 120.

Figure 4:
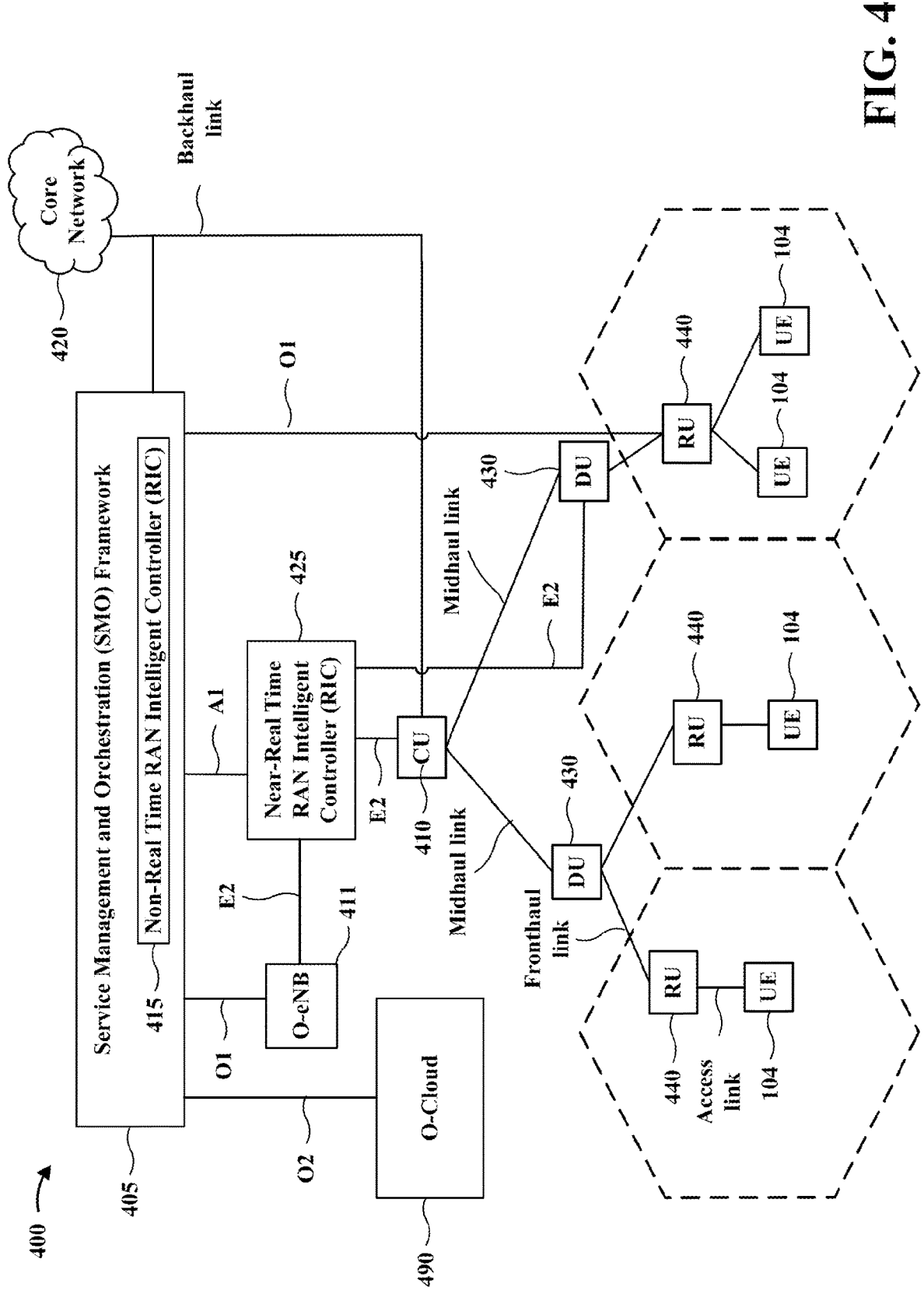
FIG. 4 shows a diagram illustrating an example disaggregated base station architecture.

FIG. 4 shows a diagram illustrating an example disaggregated base station 400 architecture. The disaggregated base station 400 architecture may include one or more central units (CUs) 410 that can communicate directly with a core network 420 via a backhaul link, or indirectly with the core network 420 through one or more disaggregated base station units (such as a Near-Real Time (Near-RT) RAN Intelligent Controller (MC) 425 via an E2 link, or a Non-Real Time (Non-RT) RIC 415 associated with a Service Management and Orchestration (SMO) Framework 405, or both). A CU 410 may communicate with one or more distributed units (DUs) 430 via respective midhaul links, such as an F1 interface. The DUs 430 may communicate with one or more radio units (RUs) 440 via respective fronthaul links. The RUs 440 may communicate with respective UEs 104 via one or more radio frequency (RF) access links. In some implementations, the UE 104 may be simultaneously served by multiple RUs 440.

Each of the units, i.e., the CUs 410, the DUs 430, the RUs 440, as well as the Near-RT RICs 425, the Non-RT RICs 415 and the SMO Framework 405, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 410 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 410. The CU 410 may be configured to handle user plane functionality (i.e., Central Unit-User Plane (CU-UP)), control plane functionality (i.e., Central Unit-Control Plane (CU-CP)), or a combination thereof. In some implementations, the CU 410 can be logically split into one or more CU-UP units and one or more CU-CP units. The CU-UP unit can communicate bidirectionally with the CU-CP unit via an interface, such as the E1 interface when implemented in an O-RAN configuration. The CU 410 can be implemented to communicate with the DU 430, as necessary, for network control and signaling.

The DU 430 may correspond to a logical unit that includes one or more base station functions to control the operation of one or more RUs 440. In some aspects, the DU 430 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 430 may further host one or more low PHY layers. Each layer (or module) can be implemented with an interface configured to communicate signals with other layers (and modules) hosted by the DU 430, or with the control functions hosted by the CU 410.

Lower-layer functionality can be implemented by one or more RUs 440. In some deployments, an RU 440, controlled by a DU 430, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 440 can be implemented to handle over the air (OTA) communication with one or more UEs 104. In some implementations, real-time and non-real-time aspects of control and user plane communication with the RU(s) 440 can be controlled by the corresponding DU 430. In some scenarios, this configuration can enable the DU(s) 430 and the CU 410 to be implemented in a cloud-based RAN architecture, such as a vRAN architecture.

The SMO Framework 405 may be configured to support RAN deployment and provisioning of non-virtualized and virtualized network elements. For non-virtualized network elements, the SMO Framework 405 may be configured to support the deployment of dedicated physical resources for RAN coverage requirements which may be managed via an operations and maintenance interface (such as an O1 interface). For virtualized network elements, the SMO Framework 405 may be configured to interact with a cloud computing platform (such as an open cloud (O-Cloud) 490) to perform network element life cycle management (such as to instantiate virtualized network elements) via a cloud computing platform interface (such as an O2 interface). Such virtualized network elements can include, but are not limited to, CUs 410, DUs 430, RUs 440 and Near-RT RICs 425. In some implementations, the SMO Framework 405 can communicate with a hardware aspect of a 4G RAN, such as an open eNB (O-eNB) 411, via an O1 interface. Additionally, in some implementations, the SMO Framework 405 can communicate directly with one or more RUs 440 via an O1 interface. The SMO Framework 405 also may include a Non-RT RIC 415 configured to support functionality of the SMO Framework 405.

The Non-RT RIC 415 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 425. The Non-RT RIC 415 may be coupled to or communicate with (such as via an A1 interface) the Near-RT RIC 425. The Near-RT RIC 425 may be configured to include a logical function that enables near-real-time control and optimization of RAN elements and resources via data collection and actions over an interface (such as via an E2 interface) connecting one or more CUs 410, one or more DUs 430, or both, as well as an O-eNB, with the Near-RT RIC 425.

In some implementations, to generate AI/ML models to be deployed in the Near-RT RIC 425, the Non-RT RIC 415 may receive parameters or external enrichment information from external servers. Such information may be utilized by the Near-RT RIC 425 and may be received at the SMO Framework 405 or the Non-RT RIC 415 from non-network data sources or from network functions. In some examples, the Non-RT RIC 415 or the Near-RT RIC 425 may be configured to tune RAN behavior or performance. For example, the Non-RT RIC 415 may monitor long-term trends and patterns for performance and employ AI/ML models to perform corrective actions through the SMO Framework 405 (such as reconfiguration via O1) or via creation of RAN management policies (such as A1 policies).

Figure 5:
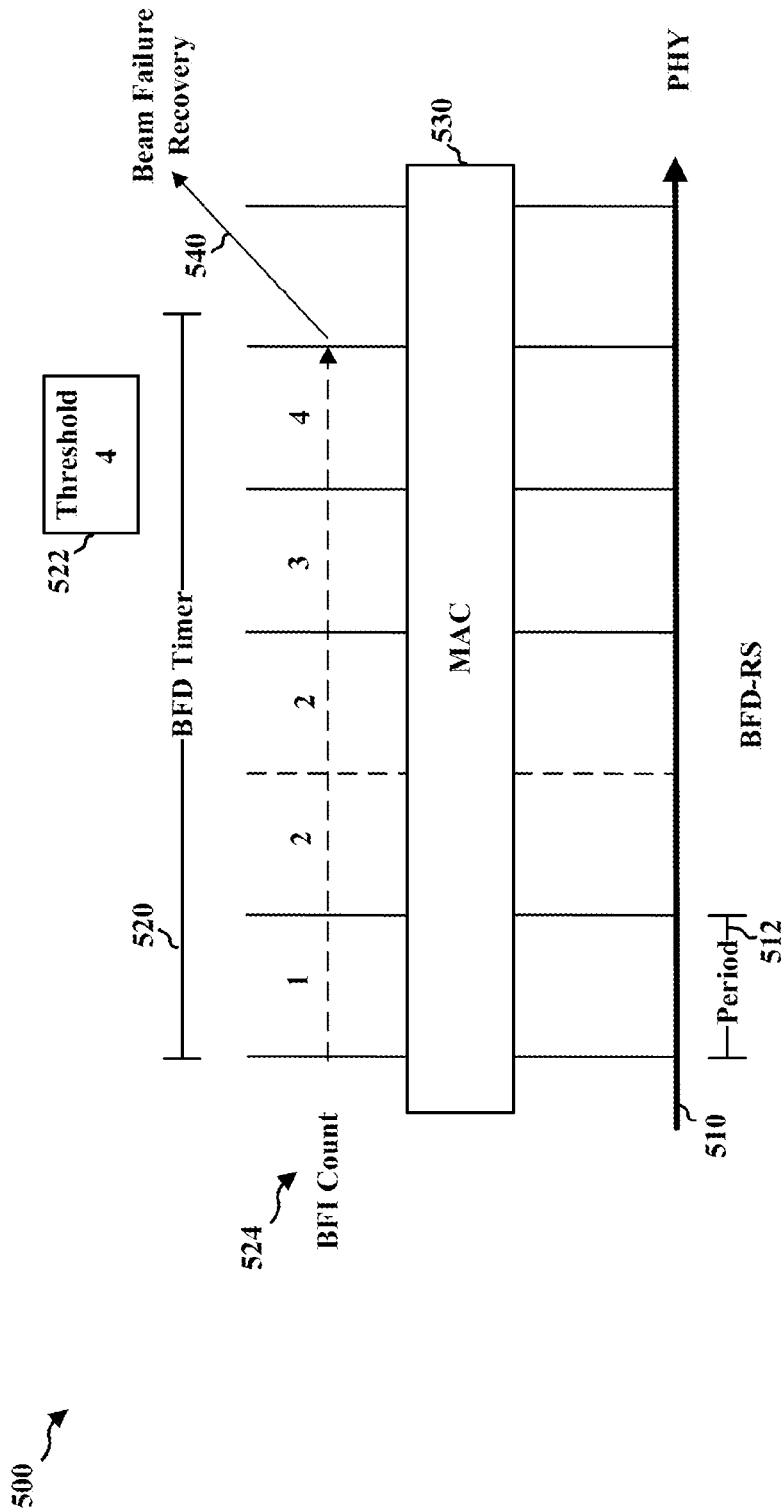
FIG. 5 is a diagram illustrating an example of a beam failure detection procedure.

FIG. 5 is a diagram 500 illustrating an example of a beam failure detection procedure. A UE 104 may be configured with a periodic BFD-RS 510. For example, the BFD-RS 510 may be a synchronization signal block (SSB) or a channel state information reference signal (CSI-RS) that is transmitted on an active beam for the UE. The BFD-RS 510 may have a periodicity that defines a period 512. The UE 104 may measure the BFD-RS at the PHY layer. For example, the UE 104 may measure a signal to interference plus noise ratio (SINR) of the BFD-RS 510. The UE 104 may detect a beam failure instance at the PHY layer when the PHY measurement does not satisfy a threshold. The PHY layer may report a beam failure instance (BFI) to a MAC layer 530.

The MAC layer 530 may be configured with a BFD timer 520 and a BFI threshold 522. The BFD timer 520 may define a time period for counting BFIs from the PHY layer. The BFI threshold 522 may define a number of BFIs when a beam failure is declared. The MAC layer 530 may maintain a BFI count 524 of BFIs received from the PHY layer during the BFD timer 520. If the MAC layer 530 receives a BFI from the PHY layer, the MAC layer 530 may increment the BFI count 524. The MAC layer 530 may measure the BFD timer 520 starting when the MAC layer 530 increments the BFI count from 0 to 1. If a BFD-RS is received where the PHY layer measurement satisfies the threshold, the PHY layer may not report a BFI and the BFI count 524 may remain unchanged. If the BFI count 524 satisfies the BFI threshold 522 during the BFD timer 520, the UE 104 may initiate a beam failure recovery (BFR) procedure 540. For example, as illustrated, the BFI threshold 522 may be set to 4, and the UE 104 may initiate the BFR procedure 540 when the BFI count 524 reaches a value of 4. Initiating the BFR procedure 540 may include transmitting a random access preamble on a physical random access channel (PRACH) based on a candidate beam.

Figure 6:
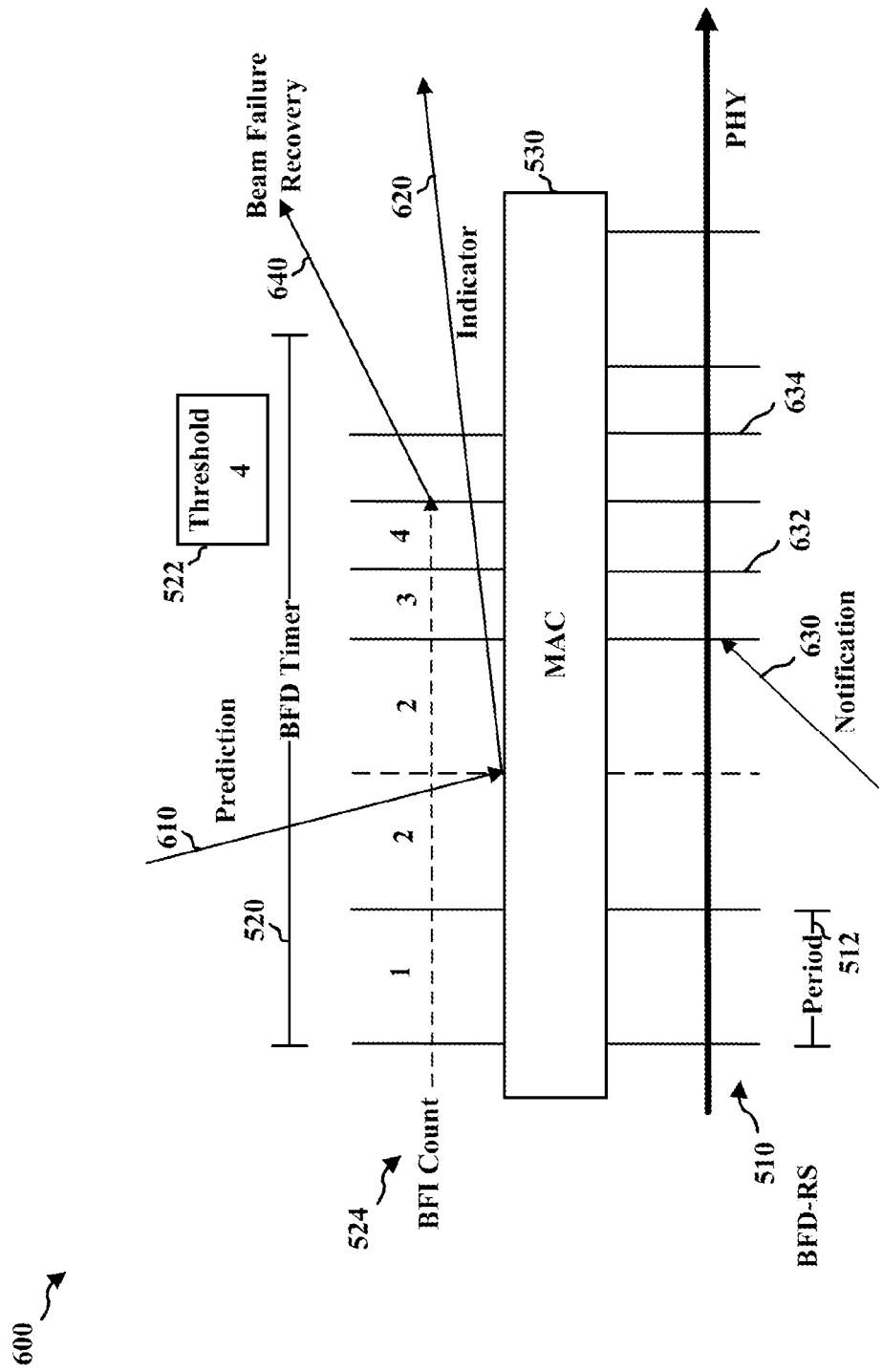
FIG. 6 is a diagram illustrating an example of a beam failure detection procedure with prediction.

FIG. 6 is a diagram 600 illustrating an example of a beam failure detection procedure with prediction. The UE 104 may be configured with the BFD-RS 410 having the period 512, the BFD timer 520, and BFI threshold 522. Similar to FIG. 5, the MAC layer 530 may receive beam failure indications from the PHY layer and track the BFI count 524 during the BFD timer 520. The UE 104 may generate a prediction 610 that a beam failure is likely to occur. For example, the prediction 610 may be based on another sensor and/or a machine-learning model trained at the UE 104. In some implementations, the prediction may be based on a condition indicated by the base station 102. For example, the prediction 610 may be when the BFI count 524 exceeds a defined percentage of the threshold 522 or when a consecutive number of BFI counts are reported. The prediction 610 may occur before the BFI count 524 reaches the BFI threshold 522.

In response to the prediction 610, the UE 104 may transmit an indicator 620 of the prediction 610 to the serving cell. The indicator 620 may indicate that a beam failure is likely to occur. In some implementations, the indicator 620 may further include a request for the serving call to take an action. For example, the indicator 620 may include a request for the serving cell not to schedule the UE for a period of time, a request for the serving cell not to transmit the BFD-RS for a period of time, a request for the serving cell to change a periodicity of the BFD-RS, or a request for additional aperiodic BFD-RS. The UE 104 may transmit the indicator 620 as a MAC control element (MAC-CE) or as an element of uplink control information (UCI).

The serving cell may respond to the indicator 620 with a notification 630 of a change to the BFD-RS 510 or to UE scheduling in response to the indicator. In some implementations, the notification 630 may increase an intensity of the BFD-RS 510. That is, the BFD-RS 510 may be transmitted more frequently by changing a pattern or period of the BFD-RS 510. For example, the notification 630 may reduce the period 512 of the BFD-RS 510. For instance, the BFD-RS 510 may be transmitted at times 632 and/or 634. The shorter period 512 may increase the number of occasions for measuring the BFD-RS. Accordingly, the PHY layer may generate more BFIs during the BFD timer 520, and the MAC layer 530 may declare a beam failure earlier. For instance, the UE 104 may initiate the BFR procedure 640 earlier than the BFR procedure 540. In some implementations, the notification 630 may schedule one or more aperiodic BFD-RS, which may similarly increase the number of occasions for measuring the BFD-RS such that the BFR procedure 640 may be declared earlier if the beam is failing.

Figure 7:
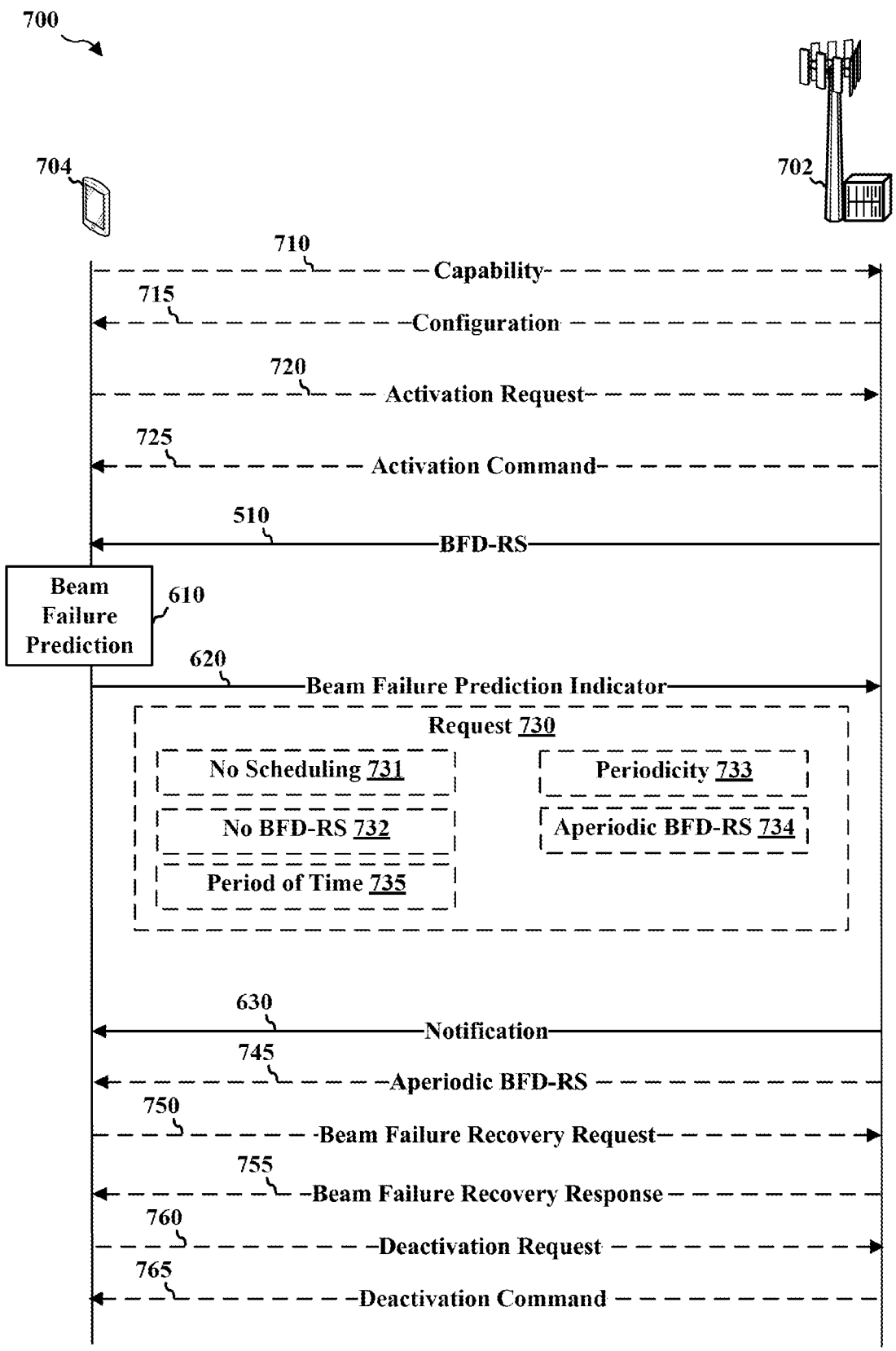
FIG. 7 is a message diagram illustrating example messages between a base station and a UE.

FIG. 7 is a message diagram 700 illustrating example messages between a base station 702 and a UE 704. The UE 704 may be an example of a UE 104 including the beam management component 140. The base station 702 may be an example of a base station 102 including the prediction control component 120.

In some implementations, the UE 704 may optionally transmit a capability message 710 to the base station 702. For example, the capability message 710 may be a RRC message. The capability message 710 may indicate, for example, that the UE 704 is capable of predicting beam failure.

In some implementations, the base station 702 may optionally transmit a configuration 715. The configuration 715 may be a RRC message. For example, the configuration 715 may include a configuration of a triggering condition to predict the beam failure or a configuration of the indicator 620. For instance, the configuration may specify one or more conditions for predicting a beam failure such as a sensor or a machine-learning model. The configuration of the indicator 620 may indicate, for example, a length of a field in a UCI or MAC-CE or a mapping of field values to requests.

In some implementations, the UE 704 may optionally transmit an activation request 720 for BFD prediction. The activation request 720 may be, for example, a MAC-CE or UCI. The UE 704 may request activation of BFD prediction based on UE discontinuous reception (DRX) configuration such as a length of a DRX cycle, on duration, or off duration, or based on a power or capacity restraint of the UE 704. The base station 702 may optionally respond to the activation request 720 with an activation command 725. The activation command 725 may be a MAC-CE or DCI. The base station 702 may also autonomously issue the activation command 725. For example, the base station 702 may grant the activation request 720 or issue the activation command 725 based on a quality of service (QoS) requirement of serving traffic, the UE DRX configuration, and/or scheduling considerations. When BFD prediction is activated for the UE 704, the UE 704 may transmit the indicator 620. If BFD prediction is deactivated for the UE 704, the UE 704 may not predict a BFD prior to the BFI count 524 reaching the threshold 522 and may not transmit the indicator 620.

The base station 702 may periodically transmit the BFD-RS 510 as discussed above regarding FIG. 5 and FIG. 6. The UE 704 may generate the beam failure prediction 610. The beam failure prediction 610 may be based on prediction techniques configured by the configuration 715. For example, the prediction may be based on a machine-learning model applied to the BFD-RS 510 or other signals received at the UE 704. In some implementations, the machine-learning model may be trained specifically for the UE, for example, based on a state of the UE 704 when previous beam failure detections occurred. As another example, a sensor at the UE 704 may detect blockage. For instance, a camera may detect an object moving in the direction of the beam, or a radar or capacitance sensor may detect an object in close proximity to an antenna. In some implementations, the beam failure prediction 610 may include predicting a duration of the beam failure condition. For instance, the camera may sense a size of the object or a rate of movement to predict a duration of the beam failure condition.

The UE 704 may transmit the indicator 620 in response to the beam failure prediction 610. In some implementations, the indicator 620 may simply indicate the prediction 610. For instance, the indicator 620 may be a single bit flag in UCI or a MAC-CE. In other implementations, the indicator 620 may include a request 730. For example, the request 730 may be a request for no scheduling 731 of the UE 704 for a period of time 735. As another example, the request 730 may be a request for no BFD-RS 732 to be transmitted by the serving cell for a period of time 735. As another example, the request 730 may be a request to change the periodicity 733 of the BFD-RS 732. For instance, the request to change the periodicity 733 may decrease the period 512 of the BFD-RS 732. As another example, the request 730 may be a request for additional aperiodic BFD-RS 734, either a number of additional transmissions or additional transmissions during a period of time 735. For example, the request for additional aperiodic BFD-RS 734 may be a request for the base station 702 to schedule additional periodic BFD-RS transmissions during the next X milliseconds. For any of the requests 730, the period of time 735 may be fixed, or the indicator 620 may identify the period of time 735.

In response to the indicator 620, the base station 702 may transmit the notification 630 to notify the UE 704 of a change to the BFD-RS 510 or to UE scheduling. For instance, the notification 630 may indicate that BFD-RS 510 will not be transmitted for a period of time 735 or that the period 512 of the BFD-RS will change. As another example, the notification 630 may schedule one or more aperiodic BFD-RS 745. As another example, the notification 630 may indicate that the UE 704 will not be scheduled to receive a downlink transmission for the period of time 735. In some cases, the UE 704 may enter a sleep mode during the period of time 735, for example, to conserve power.

As discussed above regarding FIG. 6, the UE 704 may continue to monitor the BFD-RS 510 and any aperiodic BFD-RS 735. If the BFI count 524 reaches the BFI threshold 522, the UE 704 may initiate the BFR procedure 640. For example, the UE 704 may transmit a beam failure recovery request 750 and receive a beam failure recovery response 755. In this case, the prediction 610 may be considered correct. If the BFI count 524 does not reach the BFI threshold 522 during the BFD timer 520, the UE 704 may reset the BFD timer 520 and continue to monitor the BFD-RS. In some implementations, the decision of whether to initiate the BFR procedure 640 may be logged as training data for training a machine-learning model to improve prediction of beam failure.

In some implementations, the UE 704 may transmit a deactivation request 760 for BFD prediction. The deactivation request 760 may be based on similar factors to the activation request 720. The base station 702 may transmit a deactivation command 765 in response to the deactivation request 760 or autonomously based on similar factors.

Figure 8:
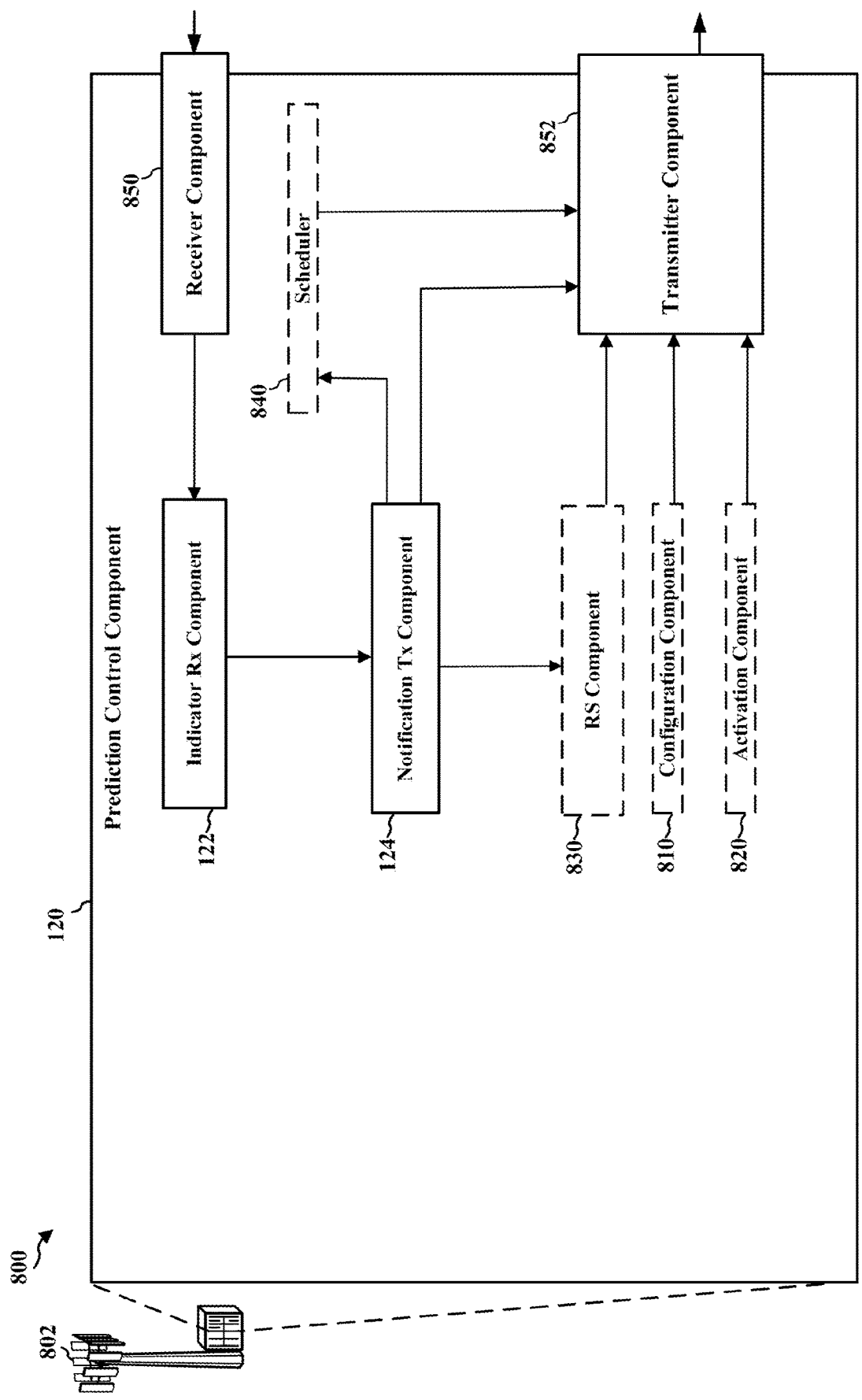
FIG. 8 is a conceptual data flow diagram illustrating the data flow between different means/components in an example base station.

FIG. 8 is a conceptual data flow diagram 800 illustrating the data flow between different means/components in an example base station 802, which may be an example of the base station 102 including the prediction control component 120. The prediction control component 120 may be implemented by the memory 376 and the Tx processor 316, the Rx processor 370, and/or the controller/processor 375 of FIG. 3. For example, the memory 376 may store executable instructions defining the prediction control component 120 and the Tx processor 316, the Rx processor 370, and/or the controller/processor 375 may execute the instructions.

The base station 802 may include a receiver component 850, which may include, for example, a radio frequency (RF) receiver for receiving the signals described herein. The base station 802 may include a transmitter component 852, which may include, for example, an RF transmitter for transmitting the signals described herein. In an aspect, the receiver component 850 and the transmitter component 852 may co-located in a transceiver such as illustrated by the Tx/Rx 318 in FIG. 3.

As discussed with respect to FIG. 1, the prediction control component 120 may include the indicator Rx component 122 and the notification Tx component 124. In some implementations, the prediction control component 120 may optionally include a configuration component 810, an activation component 820, a RS component 830, and/or a scheduler 840.

The receiver component 850 may receive UL signals from the UE 704 including the capability message 710, the activation request 720, the indicator 620, the beam failure recovery message, or the deactivation request 760. The receiver component 850 may provide the capability message 710 to the configuration component 810. The receiver component 850 may provide the activation request 720 or the deactivation request 760 to the activation component 820. The receiver component 850 may provide the indicator 620 to the indicator Rx component 122. The receiver component 850 may provide the beam failure recovery message to the scheduler 840.

The indicator Rx component 122 may be configured to receive the indicator 620 of a predicted beam failure at a UE via the receiver component 850. The indicator Rx component 122 may identify the BFD-RS corresponding to the indicator 620. The indicator Rx component 122 may determine whether the indicator 620 includes a request 730, and the period of time 735 for any request. The indicator Rx component 122 may provide the BFD-RS, request 730, and/or period of time 735 to the notification Tx component 124.

The notification Tx component 124 may be configured to transmit a notification of a change to the BFD-RS or to UE scheduling in response to the indicator 620. The notification Tx component 124 may determine an appropriate change. In some implementations, where the indicator 620 includes a request 730, the notification Tx component 124 may determine whether the request is feasible. For example, the notification Tx component 124 may determine whether additional resources are available for an aperiodic BFD-RS (e.g., by checking scheduler 840). The notification Tx component 124 may transmit the notification via the transmitter component 852, for example, as a MAC-CE or DCI. The notification Tx component 124 may provide the RS component 830 with any changed to the BFD-RS. The notification Tx component 124 may provide the scheduler 840 with any changes to UE scheduling.

In some implementations, the configuration component 810 may configure the UE with a triggering condition to predict the beam failure or a configuration of the indicator 620. For example, the triggering condition may indicate which prediction technique to use or a parameter of a condition such as a percentage of the threshold 522 or a number of consecutive BFIs. The configuration of the indicator 620 may define a length of the indicator or map field values to requests. The configuration component 810 may transmit the configuration via the transmitter component 852.

In some implementations, the activation component 820 may receive activation or deactivation requests and transmit activation or deactivation commands. The activation component 820 may receive the activation request 720 or the deactivation request 760 via the receiver component 850. The activation component 820 may determine whether to activate or deactivate beam failure prediction based on one or more of: a QoS requirement of traffic for the UE, a DRX configuration of the UE, or a restraint on power or capacity of the UE. The activation component 820 may transmit the activation command 725 or the deactivation command 765 via the transmitter component 852.

In some implementations, the RS component 830 may be configured to generate and transmit the BFD-RS 510 and/or an aperiodic BFD-RS 745. The RS component 830 may select the BFD-RS 510 based on a beam for the UE. The RS component 830 may receive changes to the BFD-RS 510 from the notification Tx component 124. The RS component 830 may transmit the BFD-RS 510 and/or an aperiodic BFD-RS via the transmitter component 852.

In some implementations, the scheduler 840 may schedule the UE to receive downlink communications. In some implementations, the scheduler 840 may determine whether a request from the UE is feasible. The scheduler 840 may receive a change to the UE schedule from the notification Tx component 124. For example, the scheduler 840 may receive a request not to schedule the UE for a time period, in which case, the scheduler 840 may cancel scheduled communications such as semi-persistent scheduling and refrain from dynamically scheduling the UE during the time period.

Figure 9:
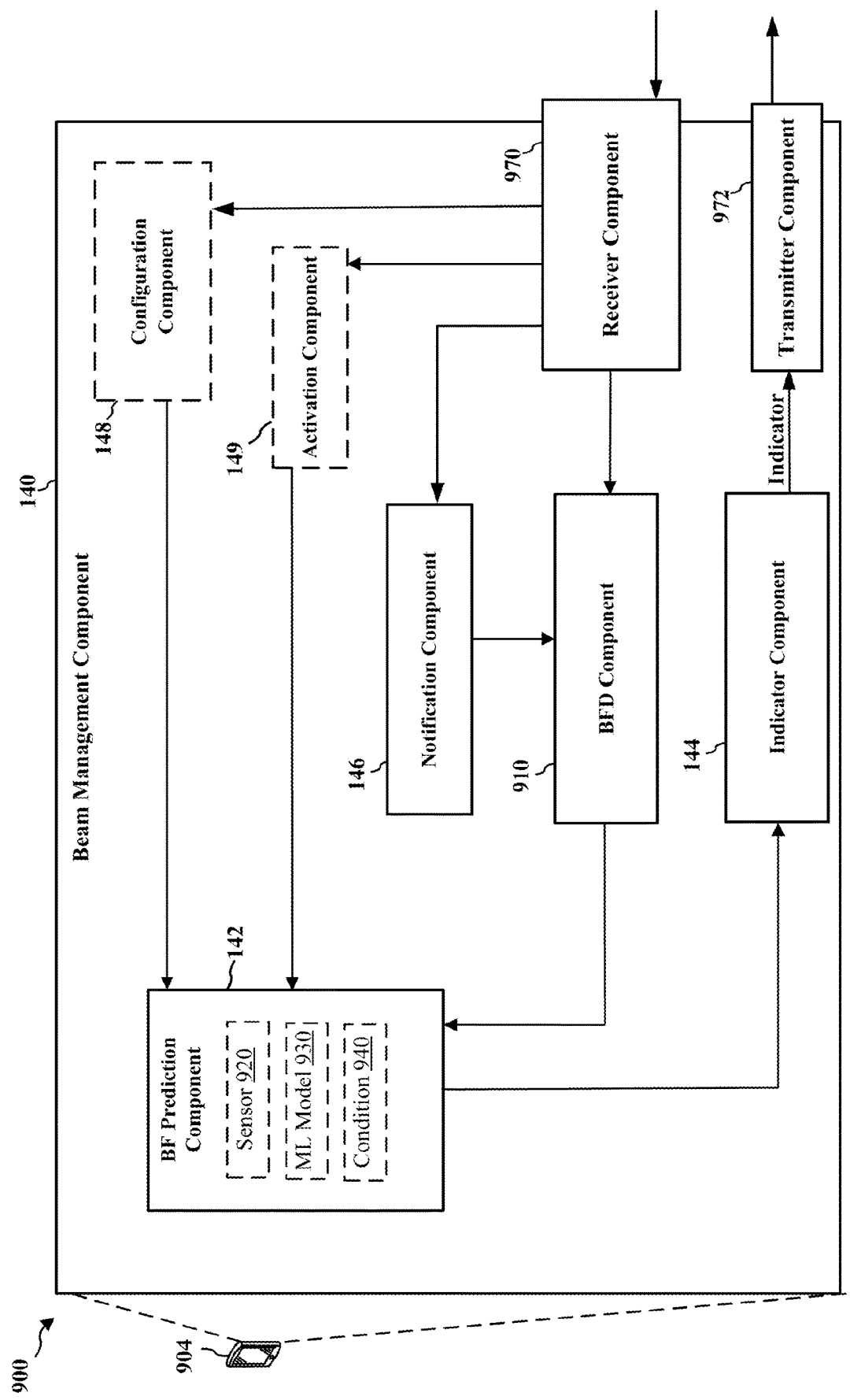
FIG. 9 is a conceptual data flow diagram illustrating the data flow between different means/components in an example UE.

FIG. 9 is a conceptual data flow diagram 900 illustrating the data flow between different means/components in an example UE 904, which may be an example of the UE 704, or the UE 104 and include the beam management component 140. The beam management component 140 may be implemented by the memory 360 and the Tx processor 368, the Rx processor 356, and/or the controller/processor 359. For example, the memory 360 may store executable instructions defining the beam management component 140 and the Tx processor 368, the Rx processor 356, and/or the controller/processor 359 may execute the instructions.

The UE 904 may include a receiver component 970, which may include, for example, a RF receiver for receiving the signals described herein. The UE 904 may include a transmitter component 972, which may include, for example, an RF transmitter for transmitting the signals described herein. In an aspect, the receiver component 970 and the transmitter component 972 may be co-located in a transceiver such as the Tx/Rx 352 in FIG. 3.

As discussed with respect to FIG. 1, the beam management component 140 may include the BF prediction component 142, the indicator component 144, and the notification component 146. In some implementations, the beam management component 140 may optionally include the configuration component 148, the activation component 149, or a BFD component 910.

The receiver component 970 may receive DL signals described herein such as the configuration 715, the activation command 725, the notification 630, the BFD-RS 510, the aperiodic BFD-RS 745, or the deactivation command 765. The receiver component 970 may provide the configuration 715 to the configuration component 148. The receiver component 970 may provide the activation command 725 and/or the deactivation command 765 to the activation component 149. The receiver component 970 may provide the notification 630 to the notification component 146. The receiver component 970 may provide the BFD-RS 510 and/or the aperiodic BFD-RS 745 to the BFD component 910.

In some implementations, the configuration component 148 may be configured to receive a configuration of a triggering condition to predict the beam failure or a configuration of the indicator 620 via the receiver component 970. The configuration component 148 may configure the BF prediction component 142 with the triggering condition. The configuration component 148 may configure the indicator component 144 with a format of the indicator 620.

In some implementations, the activation component 149 may transmitting a request for activation (e.g., activation request 720) or deactivation (e.g., deactivation request 760) of beam failure prediction. For example, the request for activation may be based on a UE DRX configuration and/or a restraint on UE power or capacity. In some implementations, the activation component 149 may receive an activation (e.g., activation command 725) or a deactivation (e.g., deactivation command 765) of beam failure prediction. The activation component 149 may activate or deactivate the BF prediction component 142 based on the activation command 725 or the deactivation command 765.

The BF prediction component 142 may be configured to predict a beam failure prior to a number of beam failure instances (e.g., BFI count 524) within a time period (BFD timer 520) reaching a configured threshold number of beam failures (e.g., BFI threshold 522). For example, the BF prediction component 142 may include a sensor 920, ML model 930, and/or condition 940 for predicting beam failure. The BF prediction component 142 may provide the prediction 610 to the indicator component 144.

The indicator component 144 may be configured to transmit an indicator of the predicted beam failure to a serving cell. For example, the indicator component 144 may transmit the indicator 620 via the transmitter component 972 as a MAC-CE or UCI. In some implementations the indicator component 144 may include the request 730 in the indicator 620. The request 730 may be associated with a period of time 735.

The notification component 146 may be configured to receive a notification of a change to a BFD-RS or to UE scheduling in response to the indicator via the receiver component 970. The notification component 146 may provide any changes to the BFD-RS to the BFD component 910. For example, the notification component 146 may configure the BFD component 910 to receive the BFD-RS 510 with a different periodicity or configure the BFD component 910 to receive the aperiodic BFD-RS 745. The notification component 146 may configure the receiver component 970 based on a change to UE scheduling. For example, the notification component 146 may put the receiver component 970 into a sleep mode if the notification indicates that the UE will not be scheduled during the period of time 735.

In some implementations, the BFD component 910 may be configured to declare a beam failure based on the BFI count 524 reaching the BFI threshold 522 within the BFD timer 520. The BFD component 910 may count BFIs indicated by a PHY layer based on measurements of the BFD-RS 510 and/or the aperiodic BFD-RS 745. The BFD component 910 may transmit the beam failure recovery request 750 via the transmitter component 972. The BFD component 910 may receive a beam failure recovery response 755 via the receiver component 970.

Figure 10:
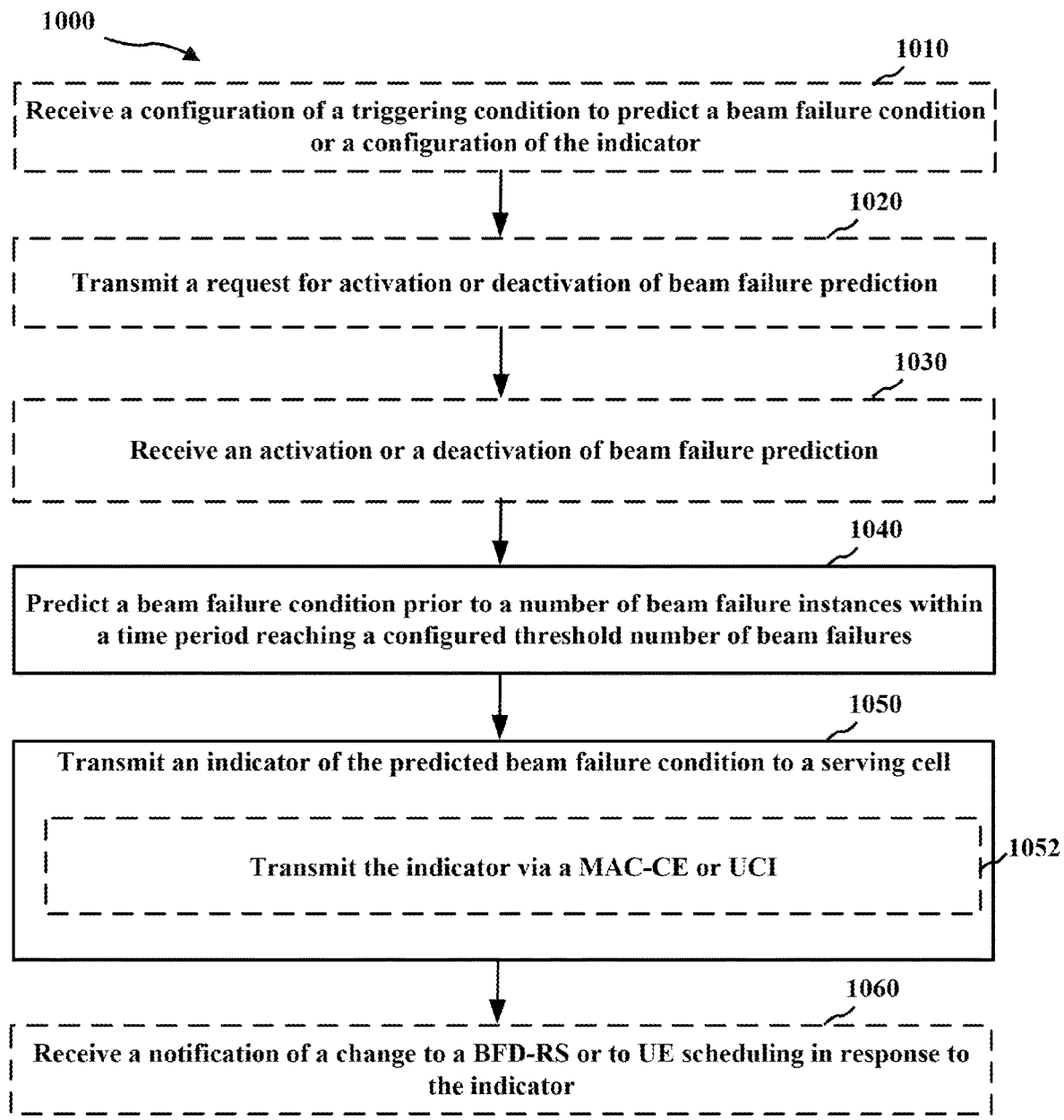
FIG. 10 is a flowchart of an example method for a UE to perform beam failure detection procedures using beam failure prediction.

FIG. 10 is a flowchart of an example method 1000 for a UE (e.g., UE 104, UE 704, or UE 904) to perform beam failure detection procedures using beam failure prediction. The method 1000 may be performed by a UE 904 (such as the UE 104, which may include the memory 360 and which may be the entire UE 104 or a component of the UE 104 such as the beam management component 140, Tx processor 368, the Rx processor 356, or the controller/processor 359). The method 1000 may be performed by the beam management component 140 in communication with the prediction control component 120 of the base station 102. Optional blocks are shown with dashed lines.

At block 1010, the method 1000 may optionally include receiving a configuration of a triggering condition to predict the beam failure or a configuration of the indicator. In some implementations, for example, the UE 104, the Rx processor 356 or the controller/processor 359 may execute the beam management component 140 or the configuration component 148 to receive a configuration 715 of a triggering condition to predict the beam failure or a configuration 715 of the indicator. Accordingly, the UE 104, the Rx processor 356, or the controller/processor 359 executing the beam management component 140 or the configuration component 148 may provide means for receiving a configuration of a triggering condition to predict the beam failure or a configuration of the indicator.

At block 1020, the method 1000 may optionally include transmitting a request for activation or deactivation of beam failure prediction. In some implementations, for example, the UE 104, the Tx processor 368 or the controller/processor 359 may execute the beam management component 140 or the activation component 149 to transmit the request for activation (e.g., activation request 720) or deactivation (e.g., deactivation request 760) of beam failure prediction. Accordingly, the UE 104, the Tx processor 368, or the controller/processor 359 executing the beam management component 140 or the activation component 149 may provide means for transmitting a request for activation or deactivation of beam failure prediction.

At block 1030, the method 1000 may include receiving an activation or a deactivation of beam failure prediction. In some implementations, for example, the UE 104, the Rx processor 356 or the controller/processor 359 may execute the beam management component 140 or the activation component 149 to receive the activation (e.g., activation command 725) or a deactivation (e.g., deactivation command 765) of beam failure prediction. Accordingly, the UE 104, the Rx processor 356, or the controller/processor 359 executing the beam management component 140 or the activation component 149 may provide means for receiving an activation or a deactivation of beam failure prediction.

At block 1040, the method 1000 may include predicting a beam failure prior to a number of beam failure instances within a time period reaching a configured threshold number of beam failures. In some implementations, for example, the UE 104, the Rx processor 356, the Tx processor 368, or the controller/processor 359 may execute the beam management component 140 or the BF prediction component 142 to predict the beam failure prior to a number of beam failure instances (e.g., BFI count 524) within a time period (e.g., BFD timer 520) reaching a configured threshold (e.g., BFI threshold 522) number of beam failures. Accordingly, the UE 104, the Rx processor 356, the Tx processor 368, or the controller/processor 359 executing the beam management component 140 or the BF prediction component 142 may provide means for predicting a beam failure prior to a number of beam failure instances within a time period reaching a configured threshold number of beam failures.

At block 1050, the method 1000 may include transmitting an indicator of the predicted beam failure condition to a serving cell. In some implementations, for example, the UE 104, the Rx processor 356, or the controller/processor 359 may execute the beam management component 140 or the indicator component 144 to transmit the indicator 620 of the predicted beam failure condition to the serving cell (e.g., of base station 702). For example, at sub-block 1052, the block 1050 may include transmitting the indicator 620 via a MAC-CE or UCI. In some implementations, the indicator includes a request for the serving cell not to schedule the UE for a period of time. The indicator 620 may identify the period of time. In some implementations, the indicator 620 includes a request for the serving cell not to transmit the BFD-RS for a period of time. The period of time may be based on a predicted duration of the beam failure condition. In some implementations, the indicator includes a request for the serving cell to change a periodicity of the BFD-RS. In some implementations, the indicator includes a request for additional aperiodic BFD-RS. The request for additional aperiodic BFD-RS may include a period of validity for the additional aperiodic BFD-RS. Accordingly, the UE 104, the Rx processor 356, the Tx processor 368, or the controller/processor 359 executing the beam management component 140 the indicator component 144 may provide means for transmitting an indicator of the predicted beam failure condition to a serving cell.

At block 1060, the method 1000 may include receiving a notification of a change to a BFD-RS or to UE scheduling in response to the indicator. In some implementations, for example, the UE 104, the Rx processor 356, or the controller/processor 359 may execute the beam management component 140 or notification component 146 to receive the notification 630 of a change to a BFD-RS or to UE scheduling in response to the indicator 620. Accordingly, the UE 104, the Tx processor 368, or the controller/processor 359 executing the beam management component 140 or the notification component 146 may provide means for receiving a notification of a change to a BFD-RS or to UE scheduling in response to the indicator.

Figure 11:
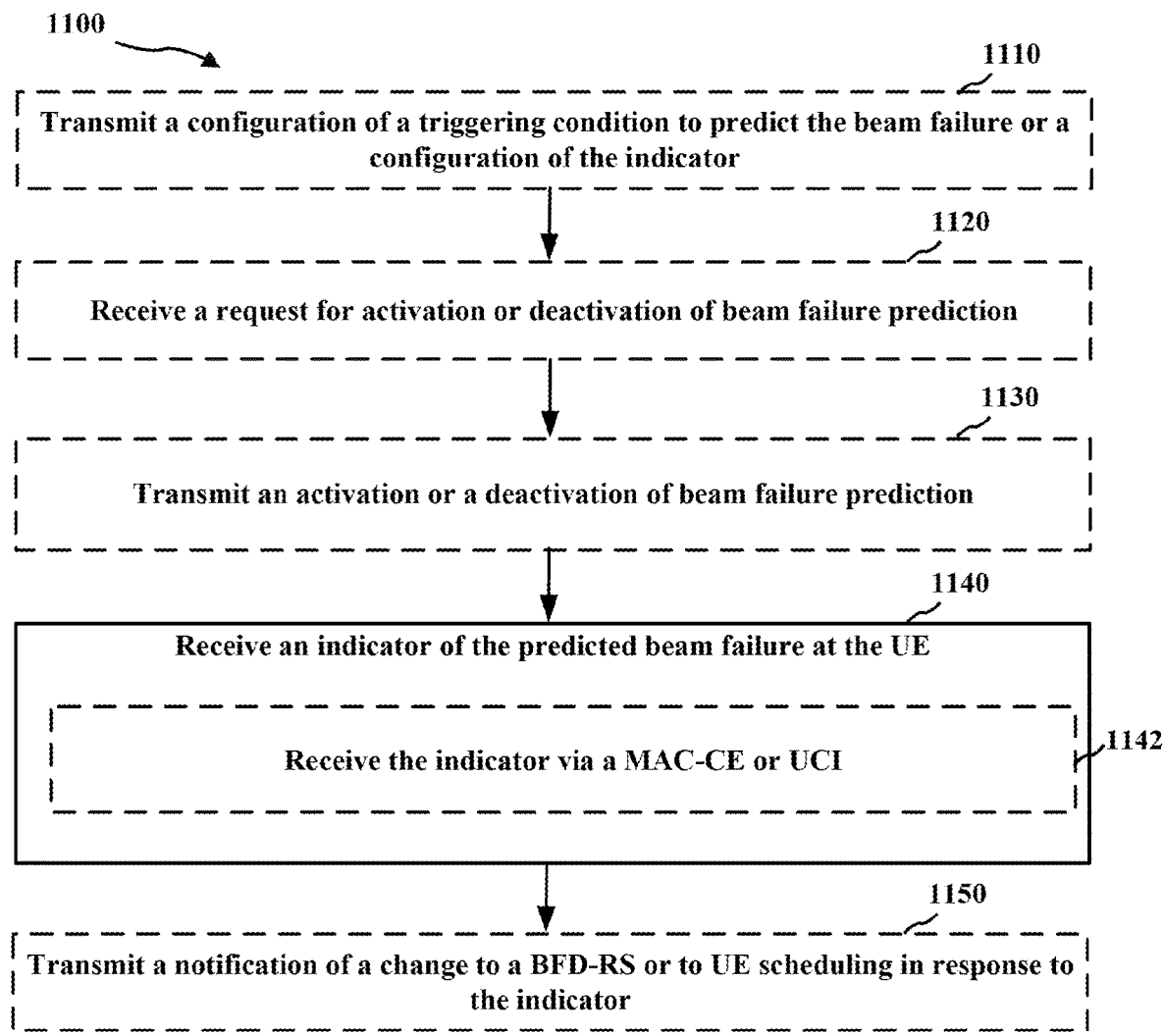
FIG. 11 is a flowchart of an example method for a base station to control beam failure prediction at a UE.

FIG. 11 is a flowchart of an example method 1100 for a base station to control beam failure prediction at a UE. The method 1100 may be performed by a base station (such as the base station 102, which may include the memory 376 and which may be the entire base station 102 or a component of the base station 102 such as the prediction control component 120, the Tx processor 316, the Rx processor 370, or the controller/processor 375). The method 1100 may be performed by the prediction control component 120 in communication with the beam management component 140 of the UE 104.

At block 1110, the method 1100 may optionally include transmitting a configuration of a triggering condition to predict the beam failure condition or a configuration of the indicator. In some implementations, for example, the base station 102, the Tx processor 316, or the controller/processor 375 may execute the prediction control component 120 or the configuration component 810 to transmit the configuration 715 of a triggering condition to predict the beam failure condition or a configuration 715 of the indicator 620. Accordingly, the base station 102, the Tx processor 316, or the controller/processor 375 executing the prediction control component 120 or the configuration component 810 may provide means for transmitting a configuration of a triggering condition to predict the beam failure condition or a configuration of the indicator.

At block 1120, the method 1100 may optionally include receiving a request for activation or deactivation of beam failure prediction. In some implementations, for example, the base station 102, the Tx processor 316, or the controller/processor 375 may execute the prediction control component 120 or the activation component 820 to receive a request for activation (e.g., activation request 720) or deactivation (e.g., deactivation request 760) of beam failure prediction. Accordingly, the base station 102, the Tx processor 316, or the controller/processor 375 executing the prediction control component 120 or the activation component 820 may provide means receiving a request for activation or deactivation of beam failure prediction.

At block 1130, the method 1100 may include transmitting an activation or a deactivation of beam failure prediction. In some implementations, for example, base station 102, the Tx processor 316, or the controller/processor 375 may execute the prediction control component 120 or the activation component 820 to transmit an activation (e.g., activation command 725) or a deactivation (e.g., deactivation command 765) of beam failure prediction. Accordingly, the base station 102, the Tx processor 316, or the controller/processor 375 executing the prediction control component 120 or the activation component 820 may provide means for transmitting an activation or a deactivation of beam failure prediction.

At block 1140, the method 1100 may include receiving an indicator of the predicted beam failure at a UE. In some implementations, for example, the base station 102, the Rx processor 370, or the controller/processor 375 may execute the prediction control component 120 or the indicator Rx component 122 to receive an indicator 620 of the predicted beam failure at the UE. For example, at sub-block 1142, the block 1040 may include receiving the indicator 620 via a MAC-CE or UCI. In some implementations, the indicator 620 includes a request for the serving cell not to schedule the UE for a period of time. The indicator 620 may identify the period of time. In some implementations, the indicator 620 includes a request for the serving cell not to transmit the BFD-RS for a period of time. The period of time may be based on a predicted duration of the beam failure. In some implementations, the indicator includes a request for the serving cell to change a periodicity of the BFD-RS. In some implementations, the indicator includes a request for additional aperiodic BFD-RS. The request for additional aperiodic BFD-RS may include a period of validity for the additional aperiodic BFD-RS. Accordingly, the base station 102, the Rx processor 370, or the controller/processor 375 executing the prediction control component 120 or the indicator Rx component 122 may provide means for receiving an indicator of the predicted beam failure at a UE.

At block 1150, the method 1100 may include transmitting a notification of a change to a BFD-RS or to UE scheduling in response to the indicator. In some implementations, for example, base station 102, the Tx processor 316, or the controller/processor 375 may execute the prediction control component 120 or the notification Tx component 124 to transmit a notification 630 of a change to a BFD-RS or to UE scheduling in response to the indicator 620. Accordingly, the base station 102, the Tx processor 316, or the controller/processor 375 executing the prediction control component 120 or the notification Tx component 124 may provide means for transmitting a notification of a change to a BFD-RS or to UE scheduling in response to the indicator.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

The following numbered clauses provide an overview of aspects of the present disclosure:

1. A method of wireless communication for a user equipment (UE), comprising:
   predicting a beam failure condition prior to a number of beam failure instances within a time period reaching a configured threshold number of beam failures;
   transmitting an indicator of the predicted beam failure condition to a serving cell; and
   receiving a notification of a change to a beam failure detection reference signal (BFD-RS) or to UE scheduling in response to the indicator.
2. The method of clause 1, wherein the indicator includes a request for the serving cell not to schedule the UE for a period of time.
3. The method of clause 2, wherein the indicator identifies the period of time.
4. The method of any of clauses 1-3, wherein the indicator includes a request for the serving cell not to transmit the BFD-RS for a period of time.
5. The method of clause 4, wherein the period of time is based on a predicted duration of the beam failure.
6. The method of any of clauses 1-3, wherein the indicator includes a request for the serving cell to change a periodicity of the BFD-RS.
7. The method of any of clauses 1-3, wherein the indicator includes a request for additional aperiodic BFD-RS.
8. The method of clause 7, wherein the request for additional aperiodic BFD-RS includes a period of validity for the additional aperiodic BFD-RS.
9. The method of any of clauses 1-8, wherein transmitting the indicator comprises transmitting the indicator via a media access control (MAC) control element (CE) or uplink control information (UCI).
10. The method of any of clauses 1-9, further comprising receiving a configuration of a triggering condition to predict the beam failure or a configuration of the indicator.
11. The method of any of clauses 1-10, further comprising receiving an activation or a deactivation of beam failure prediction.
12. The method of clause 11, further comprising transmitting a request for activation or deactivation of beam failure prediction.
13. A method of wireless communication at a serving cell, comprising:
    receiving an indicator of a predicted beam failure at a UE; and transmitting a notification of a change to a beam failure detection reference signal (BFD-RS) or to UE scheduling in response to the indicator.

14. The method of clause 13, wherein the indicator includes a request for the serving cell not to schedule the UE for a period of time.

15. The method of clause 14, wherein the indicator identifies the period of time.

16. The method of any of clauses 13-15, wherein the indicator includes a request for the serving cell not to transmit the BFD-RS for a period of time.

17. The method of any of clauses 13-15, wherein the indicator includes a request for the serving cell to change a periodicity of the BFD-RS.

18. The method of any of clauses 13-15, wherein the indicator includes a request for additional aperiodic BFD-RS.

19. The method of clause 18, wherein the notification includes a period of validity for the additional aperiodic BFD-RS.

20. The method of any of clauses 13-19, wherein receiving the indicator comprises receiving the indicator via a media access control (MAC) control element (CE) or uplink control information (UCI).

21. The method of any of clauses 13-20, further comprising transmitting a configuration of a triggering condition to predict the beam failure or a configuration of the indicator.

22. The method of any of clauses 13-21, further comprising transmitting an activation of beam failure prediction.

23. The method of clause 22, wherein transmitting the activation of beam failure prediction is based on one or more of: a quality of service (QoS) requirement of traffic for the UE, a discontinuous reception (DRX) configuration of the UE, or a restraint on power or capacity of the UE.

24. The method of clause 22, further comprising receiving a request for activation of beam failure prediction, wherein the activation of beam failure prediction is in response to the request for activation of beam failure prediction.

25. An apparatus for wireless communication for a user equipment (UE), comprising:
a memory storing computer-executable instructions; and
at least one processor coupled to the memory and configured to execute the computer-executable instructions to perform the method of any of clauses 1-12.

25. An apparatus for wireless communication for a user equipment (UE), comprising means for performing the method of any of clauses 1-12.

26. A non-transitory computer-readable medium storing computer executable code, the code when executed by a processor of a user equipment (UE) causes the processor to perform the method of any of clauses 1-12.

27. An apparatus for wireless communication for a base station, comprising:
a memory storing computer-executable instructions; and
at least one processor coupled to the memory and configured to execute the computer-executable instructions to: perform the method of any of clauses 13-24.

28. An apparatus for wireless communication for a base station, comprising means for performing the method of any of clauses 13-24.

29. A non-transitory computer-readable medium storing computer executable code, the code when executed by a processor of a base station causes the processor to perform the method of any of clauses 13-24.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The invention claimed is:

1. A method of wireless communication for a user equipment (UE), comprising:
predicting a beam failure condition prior to a number of beam failure instances within a time period reaching a configured threshold number of beam failures;
transmitting an indicator of the predicted beam failure condition to a serving cell, wherein the indicator includes a request for the serving cell to change a periodicity of a beam failure detection reference signal (BFD-RS) transmitted by the serving cell; and
receiving a notification of a change to the periodicity of the BFD-RS or a change to UE scheduling in response to the indicator.

2. The method of claim 1, wherein the indicator includes a request for the serving cell not to schedule the UE for a period of time.

3. The method of claim 2, wherein the indicator identifies the period of time.

4. The method of claim 1, wherein the indicator includes a request for the serving cell not to transmit the BFD-RS for a period of time.

5. The method of claim 4, wherein the period of time is based on a predicted duration of the beam failure condition.

6. The method of claim 1, wherein the indicator includes a request for additional aperiodic BFD-RS.

7. The method of claim 6, wherein the request for additional aperiodic BFD-RS includes a period of validity for the additional aperiodic BFD-RS.

8. The method of claim 1, wherein transmitting the indicator comprises transmitting the indicator via a media access control (MAC) control element (CE) or uplink control information (UCI).

9. The method of claim 1, further comprising receiving a configuration of a triggering condition to predict the beam failure condition or a configuration of the indicator.

10. The method of claim 1, further comprising receiving an activation or a deactivation of beam failure prediction.

11. The method of claim 10, further comprising transmitting a request for activation or deactivation of beam failure prediction.

12. A method of wireless communication at a serving cell, comprising:
receiving an indicator of a predicted beam failure at a UE, wherein the indicator includes a request for the serving cell to change a periodicity of a beam failure detection reference signal (BFD-RS) transmitted by the serving cell; and
transmitting a notification of a change to the periodicity of the BFD-RS or a change to UE scheduling in response to the indicator.

13. The method of claim 12, wherein the indicator includes a request for the serving cell not to schedule the UE for a period of time.

14. The method of claim 13, wherein the indicator identifies the period of time.

15. The method of claim 12, wherein the indicator includes a request for the serving cell not to transmit the BFD-RS for a period of time.

16. The method of claim 12, wherein the indicator includes a request for additional aperiodic BFD-RS.

17. The method of claim 16, wherein the notification includes a period of validity for the additional aperiodic BFD-RS.

18. The method of claim 12, wherein receiving the indicator comprises receiving the indicator via a media access control (MAC) control element (CE) or uplink control information (UCI).

19. The method of claim 12, further comprising transmitting a configuration of a triggering condition to predict the beam failure or a configuration of the indicator.

20. The method of claim 12, further comprising transmitting an activation of beam failure prediction.

21. The method of claim 20, wherein transmitting the activation of beam failure prediction is based on one or more of: a quality of service (QOS) requirement of traffic for the UE, a discontinuous reception (DRX) configuration of the UE, or a restraint on power or capacity of the UE.

22. The method of claim 20, further comprising receiving a request for activation of beam failure prediction, wherein the activation of beam failure prediction is in response to the request for activation of beam failure prediction.

23. An apparatus for wireless communication for a user equipment (UE), comprising:
a memory storing computer-executable instructions; and
at least one processor coupled to the memory and configured to execute the computer-executable instructions to:
predict a beam failure condition prior to a number of beam failure instances within a time period reaching a configured threshold number of beam failures;
transmit an indicator of the predicted beam failure condition to a serving cell, wherein the indicator includes a request for the serving cell to change a periodicity of a beam failure detection reference signal (BFD-RS) transmitted by the serving cell; and
receive a notification of a change to the periodicity of the BFD-RS or a change to UE scheduling in response to the indicator.

24. The apparatus of claim 23, wherein the indicator includes a request for the serving cell not to schedule the UE for a period of time.

25. The apparatus of claim 23, wherein the indicator includes a request for the serving cell not to transmit the BFD-RS for a period of time.

26. The apparatus of claim 23, wherein the at least one processor is configured to receive a configuration of a triggering condition to predict the beam failure or a configuration of the indicator.

27. The apparatus of claim 23, wherein the indicator includes a request for additional aperiodic BFD-RS.

28. An apparatus for wireless communication for a base station, comprising:
a memory storing computer-executable instructions; and
at least one processor coupled to the memory and configured to execute the computer-executable instructions to:
receive an indicator of a predicted beam failure at a UE, wherein the indicator includes a request for a serving cell of the base station to change a periodicity of a beam failure detection reference signal (BFD-RS) transmitted by the serving cell; and
transmit a notification of a change to the periodicity of the BFD-RS or a change to UE scheduling in response to the indicator.

29. The apparatus of claim 28, wherein the indicator includes a request for additional aperiodic BFD-RS.

* * * * *